United States Patent [19]
Hofmann et al.

[11] Patent Number: 5,711,882
[45] Date of Patent: Jan. 27, 1998

[54] GAS SEPARATION MEMBRANE MODULE AND PROCESS

[75] Inventors: Thomas Hofmann, Sunnyvale, Calif.; Matthias Wessling, Enschede, Netherlands; Richard W. Baker, Palo Alto, Calif.

[73] Assignee: Membrane Technology and Research, Inc., Menlo Park, Calif.

[21] Appl. No.: 536,633

[22] Filed: Sep. 29, 1995

[51] Int. Cl.$^6$ .................................................. B01D 15/00
[52] U.S. Cl. .................... 210/640; 210/321.74; 210/456; 210/321.83; 95/43; 95/45; 95/51; 95/55; 96/6
[58] Field of Search ...................... 210/456, 640, 210/321.74, 321.83; 95/43, 45, 51, 55; 96/6

[56] References Cited

U.S. PATENT DOCUMENTS

| | | | |
|---|---|---|---|
| 3,962,096 | 6/1976 | Ishii et al. ........................ | 210/456 X |
| 4,033,878 | 7/1977 | Foreman et al. ..................... | 210/336 |
| 4,311,594 | 1/1982 | Perry ............................. | 210/640 |
| 4,765,893 | 8/1988 | Kohlheb .......................... | 210/315 |
| 4,792,401 | 12/1988 | Truex et al. ...................... | 210/321.74 |
| 4,814,079 | 3/1989 | Schneider ........................ | 210/321.83 |
| 5,034,126 | 7/1991 | Reddy et al. ..................... | 210/321.74 |
| 5,096,584 | 3/1992 | Reddy et al. ..................... | 210/321.83 |
| 5,154,832 | 10/1992 | Yamamura et al. ................. | 210/640 |

*Primary Examiner*—Ana Fortuna
*Attorney, Agent, or Firm*—J. Farrant

[57] ABSTRACT

A spiral-wound, gas-separation membrane module and a gas-separation process. The module and process provide at least partial counter-current flow between the feed and permeate gas streams without requiring a permeate sweep. The counter-current flow pattern can be achieved by appropriate placement of barriers or baffles in the feed channel. Similar modules and processes may also be used for pervaporation.

40 Claims, 20 Drawing Sheets

5,711,882

GAS SEPARATION MEMBRANE MODULE AND PROCESS

This invention was made in part with Government support under Contract Number 68D30132, awarded by the U.S. Environmental Protection Agency. The Government has certain rights in this invention.

FIELD OF THE INVENTION

The invention relates to spiral-wound membrane modules, particularly for gas separation.

BACKGROUND OF THE INVENTION

Spiral-wound membrane modules were originally used for artificial kidneys, and were further developed for reverse osmosis, as a way of packaging large membrane areas into small volumes. Their use has now expanded to other types of membrane separations, including ultrafiltration, gas separation and pervaporation.

In a conventional spiral-wound module, such as is described in U.S. Pat. No. 3,367,504 to Westmoreland, for example, the membrane is folded to create a membrane envelope and rolled around a perforated central permeate collection pipe. Spacers on the feed and permeate sides of the membrane keep the feed and permeate channels open. Feed fluid to be treated flows in at one end of the module, along the feed channel in a direction generally parallel to the permeate pipe and out at the other end of the module. Permeate fluid passes through the membrane, and flows in a general radially inward direction to the central permeate pipe, whence it is drawn out of the module. Thus the feed flow is generally axial and the permeate flow is generally radial, so that one stream flows cross-current to the other.

Over the years, modifications to this familiar, basic design of spiral-wound module have been proposed, for example to address issues such as fouling, concentration polarization, permeate side pressure drop, stagnant areas in the flow path, provision of a sweep on the permeate side, and so on. These modifications include changes to the flow channel geometry and directions. As representative examples:

U.S. Pat. No. 5,154,832, to Toray Industries, shows a design with multiple plugs in the permeate pipe and multiple corresponding baffles on the permeate side, to provide a radially outward then radially inward permeate flow path. The design is used to degasify water into a permeate carrier gas.

U.S. Pat. No. 5,096,584, to Dow Chemical, shows designs applicable to gas separation, using a permeate pipe plugged at its center, and permeate-side glue lines or spots, to provide sweep on the permeate side in a spiral-wound module. Optional additional lines and spots on the feed side provide the possibility of cross-flow and counter-flow configurations.

U.S. Pat. No. 5,034,126, also to Dow Chemical, and also for gas separation, shows designs having a plugged central permeate pipe, combined with a single baffle on each of the feed and permeate sides, to provide permeate sweep and a counter-current flow pattern.

U.S. Pat. No. 4,814,079, to Aqua-Chem, shows designs for reverse osmosis, ultrafiltration or microfiltration modules in which the feed spacer is substantially replaced by baffles to reduce clogging by particulates in the feed water. The baffles can be perpendicular or, less desirably, parallel, to the permeate pipe.

U.S. Pat. No. 4,765,893, to Robert Kohlheb, shows an arrangement in which a single baffle on the feed side provides a cross-flow configuration. The module is stated to be useful for all types of separation.

U.S. Pat. No. 4,033,878, to Universal Oil Products, shows a design, useful for low-pressure dialysis or direct osmosis applications, in which the feed is introduced through the central pipe, and multiple plugs in the pipe and corresponding baffles in the feed channel provide a radially outward then radially inward flow path.

To applicants' knowledge, there does not exist in the art a spiral-wound, gas-separation module adapted to provide counter-current flow between the feed and permeate sides, yet having an unobstructed permeate pipe and not requiring a permeate sweep.

SUMMARY OF THE INVENTION

The invention is a spiral-wound, gas-separation membrane module in one aspect and a counter-current gas-separation process in another. The module is conventional insofar as it contains a membrane, usually folded to make a membrane envelope, and rolled around a perforated permeate collection pipe, to provide membrane feed-side and permeate-side channels for gas flow.

The module of the invention differs from the conventional spiral-wound module design in that it provides at least partial counter-current flow between the feed and permeate gas streams.

The module of the invention differs from all other spiral-wound, gas-separation membrane module designs of which applicants are aware, such as those summarized above, in that it provides at least partial counter-current flow between the feed and permeate gas streams without a permeate sweep.

The process of the invention likewise differs from all other membrane gas-separation processes of which applicants are aware, in that it provides at least partial counter-current flow between feed and permeate gas streams without a permeate sweep.

The new modules and processes have been found to offer advantageous performance over conventional spiral-wound gas-separation modules and processes, particularly in the following situations:

(a) high levels of removal of the preferentially permeating component(s) from the feed into the permeate are to be achieved;
(b) streams of small flow rates are to be treated;
(c) the membrane selectivity is significantly higher than the available pressure ratio.

Furthermore, since the modules do not require a permeate sweep to be used, this simplifies both the engineering of the system and the operation of the process, and any downstream treatment of the permeate.

In preferred embodiments, the counter-current flow pattern is achieved by appropriate placement of barriers or baffles in the feed channel or channels of the module.

A particularly preferred arrangement is to place one or more baffles along the length of the feed channel, that is, substantially parallel to the permeate pipe, lengthwise with respect to the module. The baffles extend for most, but not all, of the length of the feed channel and divide it into a series of parallel sub-channels or channel segments. The baffles are positioned such that the portions connect end to end, so that the feed gas flows through them in sequence.

In this configuration, the feed inlet port is positioned near the central permeate pipe and directs gas into the portion of the feed channel near the core of the module. The feed outer is positioned near the periphery of the module and collects gas from the portion of the feed channel in the peripheral region of the module. The flow path for the feed gas thus provides a flow vector that is from the core of the module to the periphery, that is radially outward. Meanwhile, the permeate gas flows in the conventional manner radially inward to the central permeate collection pipe. The result is at least partially counter-current feed/permeate gas flow. Since a permeate sweep is not used, the permeate gas is withdrawn from the module undiluted by any sweep material. Also, the permeate pipe is unobstructed; that is, it does not require any plugs at its center or elsewhere within the pipe, as are needed in the prior art to obtain counter-current flow.

Other arrangements of baffles, including baffles on both feed and permeate sides, are possible.

Optionally, the perforations in the permeate pipe may be restricted to one end of the pipe, preferably the end nearer the feed inlet. This further enhances the counter-current flow effect.

In yet another aspect of the invention, the modules are suitable for use in pervaporation.

DETAILED DESCRIPTION OF THE INVENTION

Figure 1:
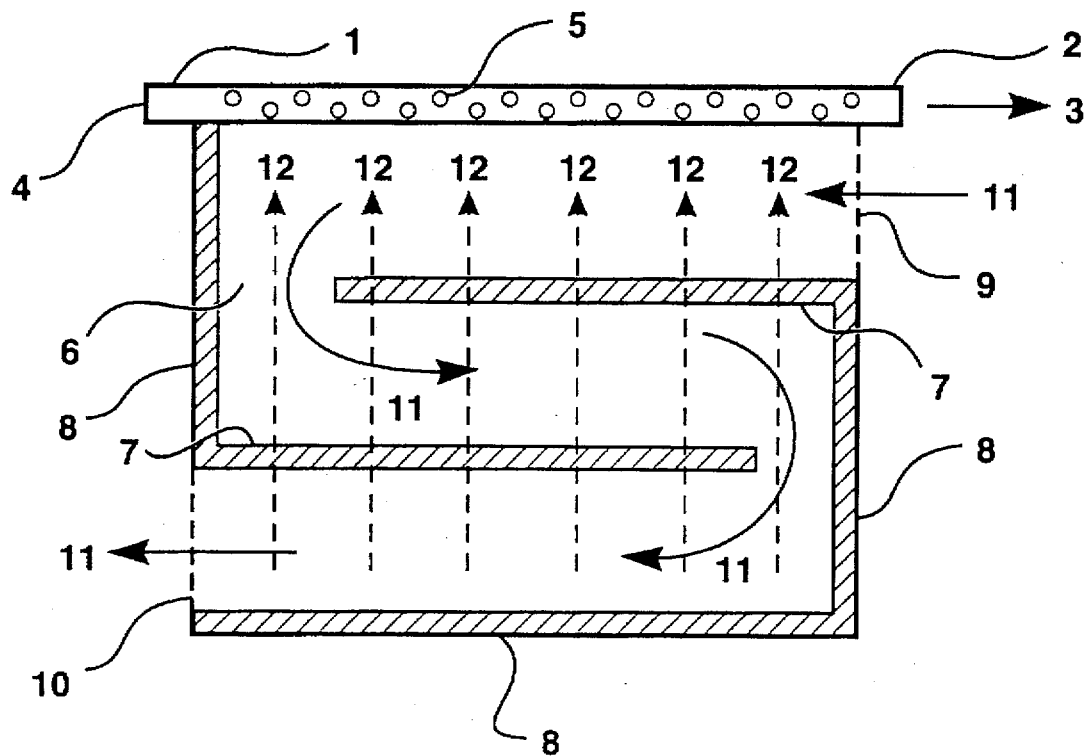
FIG. 1 is a schematic diagram showing directions of feed and permeate flow in a two-baffled module with feed channel inlet close to the permeate pipe.

The invention is a spiral-wound, gas-separation membrane module in one aspect and a counter-current gas-separation process in another. The module is conventional insofar as it contains a membrane, usually folded to make a membrane envelope, and rolled around a perforated permeate collection pipe, to provide membrane feed-side and permeate-side channels for gas flow.

The module and processes of the invention differ from the conventional spiral-wound module design and operation in providing at least partial counter-current flow between the feed and permeate gas streams. It is known that counter-current flow is preferred for good efficiency in heat- or mass-transfer operations, yet simple spiral-wound gas-separation modules that provide counter-current flow patterns are not available. To date, the only mechanism described in the literature for obtaining counter-current flow in a spiral-wound gas-separation module is to use a sweep gas on the permeate side, to provide an inlet port for the sweep gas, to obstruct the permeate pipe, and to partially block the permeate and feed channels. Such mechanisms are described in U.S. Pat. Nos. 5,096,584 and 5,034,126, summarized above. Besides being more complicated to manufacture than conventional modules, four-port modules that rely on a sweep mode of operation require additional piping and controls to bring the sweep fluid into the module. Also, the permeate stream is diluted by the sweep gas, which may necessitate additional downstream treatment.

In our module, at least partial counter-current flow is achieved without needing a sweep or carrier fluid to be provided on the permeate side. To our knowledge, this is different from all other spiral-wound, gas-separation membrane modules that have previously been available to the art.

The counter-current flow pattern is preferably achieved by a simple modification to the conventional spiral-wound module design. Preferably, this modification takes the form of appropriate placement of barriers or baffles in the feed channel, without any modification to the permeate channel. Furthermore, the permeate pipe need not be obstructed by a plug or plugs, placed centrally or otherwise within the interior length of the pipe, as is needed in the prior art to enable the module to provide counter-current feed/permeate flow.

A preferred embodiment of the invention is shown in schematic form in FIG. 1, which shows a sectional view of the module with the membrane envelope in an unwound state, and in which the elements of the drawing are identified as follows:

1 Permeate pipe
2 Open end of permeate pipe
3 Permeate stream
4 Closed end of permeate pipe
5 Perforations
6 Membrane
7 Baffle in feed channel
8 Sealed edges
9 Feed inlet port
10 Residue outlet port
11 Feed flow direction
12 Permeate flow direction Permeate collection pipe, 1, forms the central core of the module, around which one or more membranes, 6, are wrapped. The permeate pipe has an open end, 2, through which the permeate stream exits the module as indicated by arrow, 3. The other end of the pipe, 4, is closed, so that no gas can enter the module at this end. The pipe is provided with perforations, 5, of any convenient number, shape and spacing, through which the permeate gas is drawn into the permeate pipe.

The membrane, 6, shown unrolled in the figure to more clearly illustrate the invention, would be rolled around the permeate pipe when the module is manufactured, to create channels on the feed side and permeate side of the membrane through which gas may flow. Preferably, the membrane sheet is first folded to make a membrane envelope, which is positioned with the folded edge adjacent to the permeate pipe, so that the inside of the envelope forms the feed side and the outside the permeate side. Alternatively, unfolded sheets may be used and glued together, or to the permeate pipe, in such a way that the feed channel and the permeate channel are sealed from one another. The channels on the feed and permeate sides of the membrane are normally kept open by spacers, which are not shown in the drawing for simplicity.

The ends and edges of the membranes are sealed as generally indicated by shaded areas, 8. In particular, the ends of the membranes at the feed end of the module are sealed except for a region on the feed side indicated by 9 in the drawing, which is positioned close to the permeate pipe and which forms the inlet port to the feed channel. The ends of the membranes at the residue end of the module are sealed except for a region on the feed side indicated by 10 in the drawing, which is positioned close to the outer edge of the membrane sheet, which will be at the periphery of the module when rolled, and which forms the feed outlet port. As in a conventional module, the ends of the membranes on the permeate side at the feed and residue ends of the module are completely sealed, so that permeate gas cannot escape from the module except through the permeate pipe.

Figure 20:
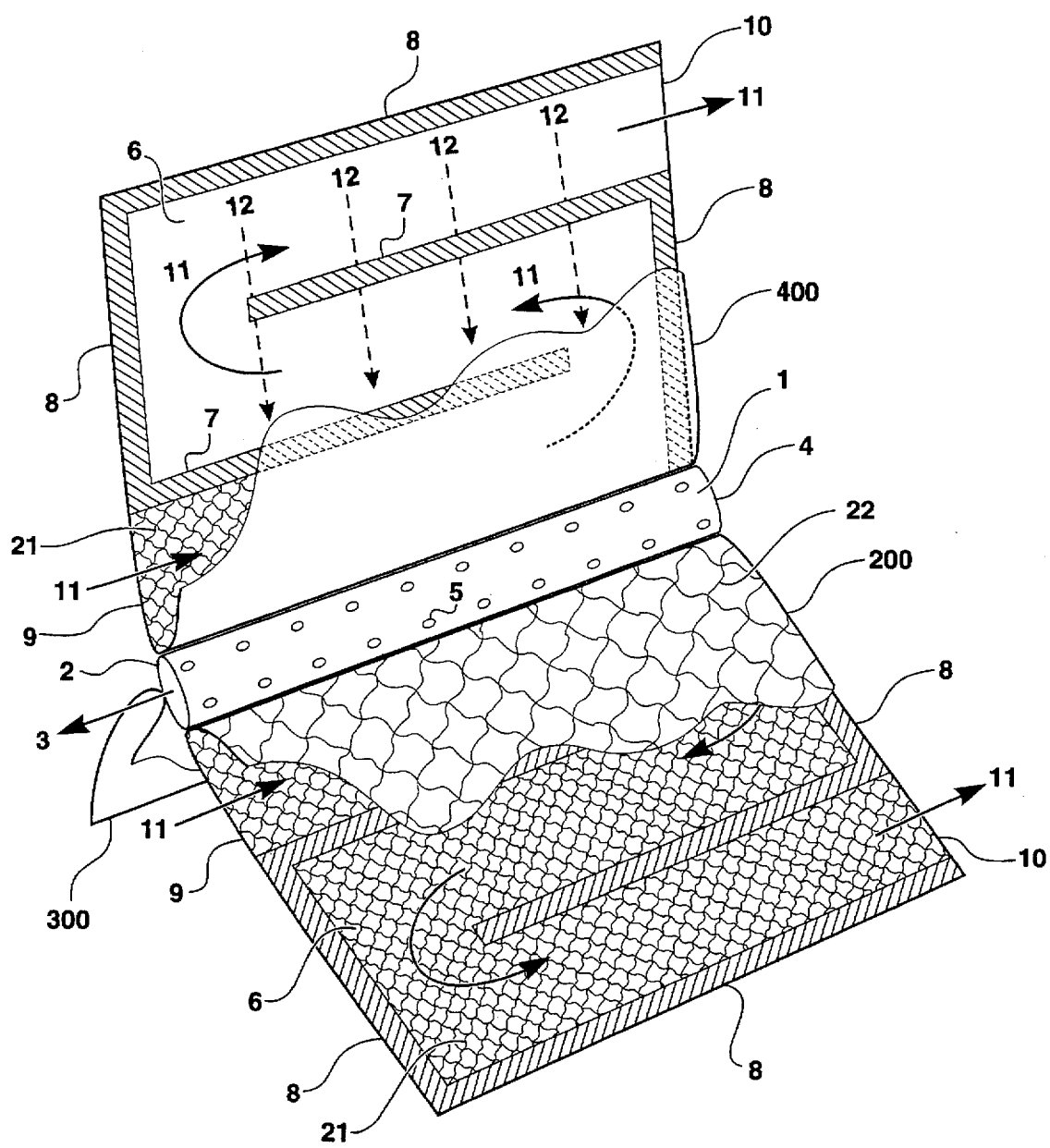
FIG. 20 is a schematic diagram showing three membrane envelopes and hence three feed channels, and showing the feed and permeate spacers in their respective channels.

In the sectional drawing of FIG. 1, the feed side of the membrane is uppermost, so that the area of membrane, 6, represents the area of one feed channel. Obviously, if there are multiple membranes or membrane envelopes in the module, as is usually the case, there will be multiple feed channels, which will each contain one or more baffles. Such an arrangement is shown in FIG. 20, which shows three membranes, 200, 300 and 400 in envelope form. For simplicity, the details of the baffles and fluid flows have been omitted from the backward envelope, 300. In FIG. 20, like elements are numbered as in FIG. 1. FIG. 20 also shows the feed spacer, 21, in the feed channel and the permeate spacer, 22, in the permeate channel. The feed channel contains two baffles, 7, which are aligned at least approximately parallel to the permeate pipe; that is, lengthwise with respect to the module. The baffles partition the feed channel into three segments, with the segments connected in series and to the inlet and outlet ports so as to form successive portions of the same flow path, so that when the module is in use, the feed gas flows through them in sequence as shown by arrows, 11.

Since the feed inlet port is positioned near the central permeate pipe and connected to the channel segment close to the central permeate pipe, and the feed outlet is positioned near the periphery of the module and connected to the feed channel segment farthest from the central permeate pipe, the flow path for the feed gas provides a flow vector that is from the core of the module to the periphery, that is radially outward. Meanwhile, the permeate gas flows in the permeate channel, which lies beneath the feed channel in the view of FIG. 1, in a conventional manner, that is, radially inward to the central permeate collection pipe, as indicated by dashed arrows, 12. The result is at least partially counter-current feed/permeate gas flow when the module is in use.

In construction of the module, any convenient method of providing the baffles may be used. A simple method, and one that we prefer, is to lay down glue lines, optionally using the same adhesive that is used to seal the ends and edges of the membranes in regions, 8. The glue should substantially fill the interstices of the feed spacer mesh in the regions indicated by 7, to avoid gas leakage between the segments of the channel. Alternatively, the baffles may be formed by placing preformed strips of compressible or flexible plastic or other material in the positions shown, or by heat-pressing a wax or other template into the feed spacer, as just two examples. The baffles need not necessarily be fastened to the membrane surfaces, because the baffles will be held in place by compression when the module is rolled.

Figure 2:
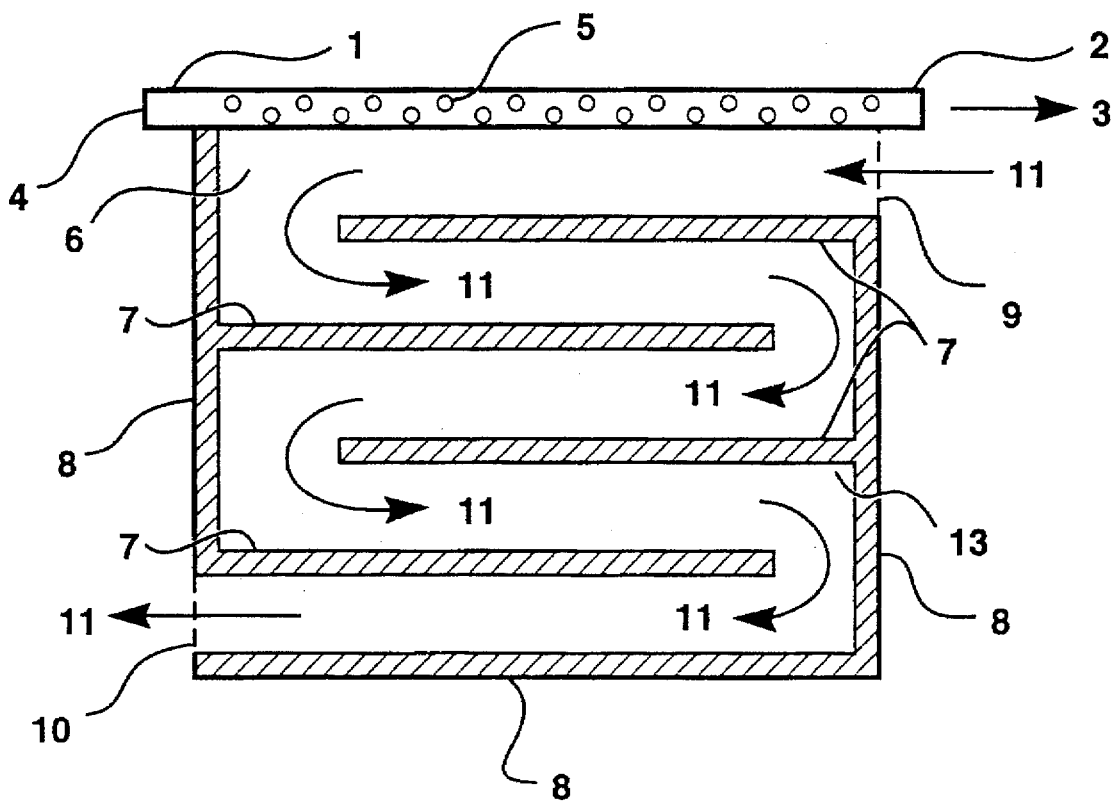
FIG. 2 is a schematic diagram showing directions of feed and permeate flow in a four-baffled module with feed channel inlet close to the permeate pipe.

FIG. 1 shows two baffles, dividing the feed channel into three segments. It will be apparent to those of skill in the art that the number of baffles is a matter of choice. An example of an embodiment with more baffles is shown in FIG. 2, in which four baffles are used. Like elements of the FIG. 2 drawing are numbered as in FIG. 1, except that the underlying permeate flow pattern, arrows 12 of FIG. 1, has been omitted for clarity.

Increasing the number of baffles has advantages and disadvantages. Once a partial counter-flow effect has been achieved by adding a radially outward vector to the feed flow direction, such as with the two baffles in FIG. 1, adding more baffles is unlikely to improve the counter-flow effects significantly. Furthermore, increasing the number of baffles increases the number of corners, one representative of which is shown as 13 on FIG. 2, where pockets of stagnant feed fluid may develop. On the other hand, a greater number of baffles reduces the width of the flow channel, thereby increasing the velocity of a given feed flow along the channel. For example, if there are four baffles as in FIG. 2, the feed channel has five segments and the feed velocity along a segment is five times what it would be in an unbaffled module having the same membrane width and length. This increase in velocity is very advantageous in situations where slow feed velocity gives rise to concentration polarization problems, such as loss of the intrinsic separation performance of the membrane.

Thus the optimum number of baffles will vary depending on the separation to be performed and the operating constraints. As a guideline, we prefer to use between one and six baffles for most gas-separation applications, with two or four being most preferred. Optionally, an odd number of baffles, such as one, three, five and so on, may be used, in which case the residue will exit the module at the same end as the feed. In this less preferred case, care must be taken to avoid mingling of the feed and residue streams.

Figure 18:
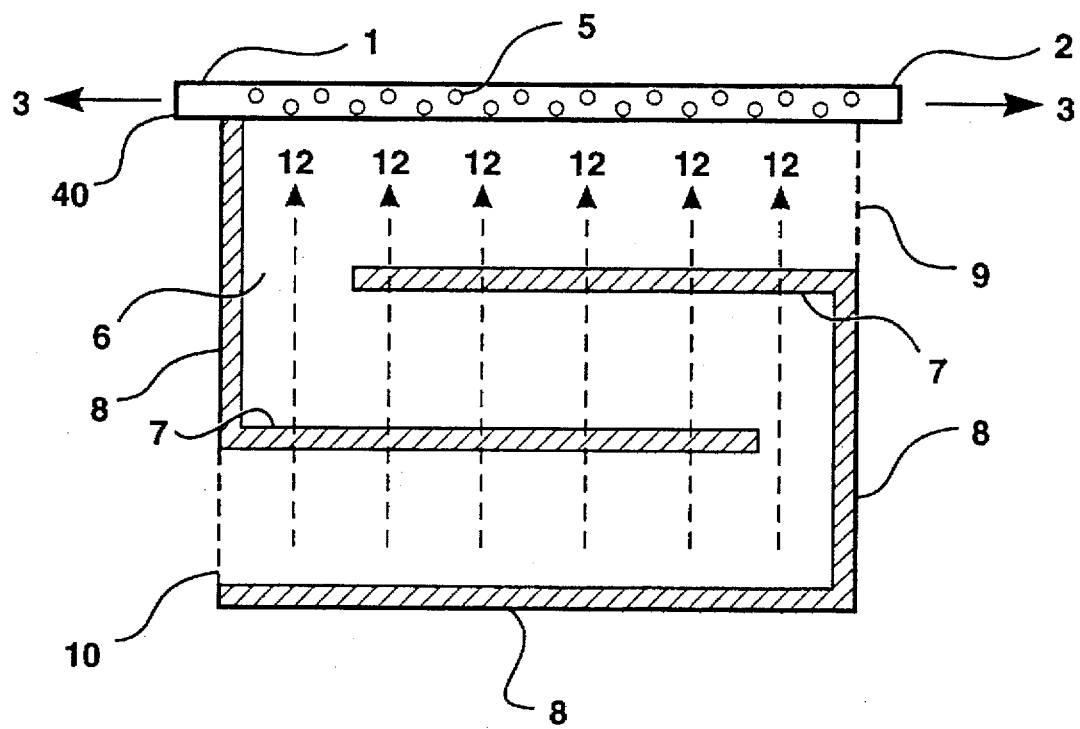
FIG. 18 is a schematic diagram showing permeate flow in a two-baffled module with the permeate pipe open at both ends.
Figure 19:
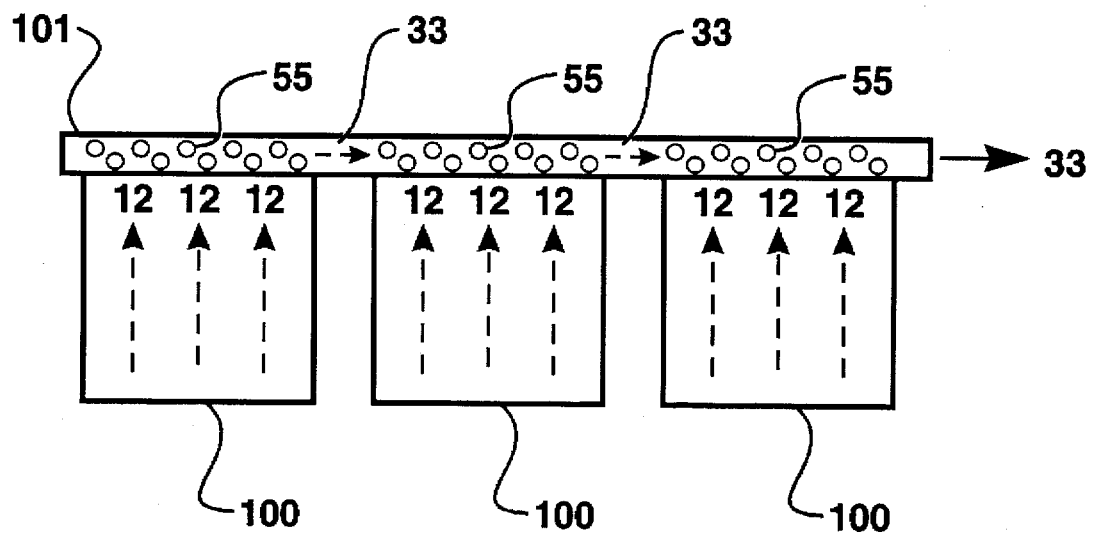
FIG. 19 is a schematic diagram showing permeate collection from a number of modules having a common permeate pipe.

FIGS. 1 and 2 show module designs in which the permeate pipe is open at one end only. Having only one end of the permeate pipe open provides the simplest design in terms of engineering, piping and controls. Optionally, however, as is common with conventional modules, the permeate pipe may be open at both ends. FIG. 18 shows one such configuration. Like elements are numbered as in FIGS. 1 and 2. The permeate pipe now has two open ends, 2 and 40, and permeate can be drawn out at both as indicated by arrows, 3. FIG. 19 shows another arrangement, which can be used when multiple membrane modules are to be housed in a single pressure vessel, for example. The permeate pipe, 101, is now common to all three modules shown. The individual modules, 100, can be configured as in FIG. 1, FIG. 2, FIG. 3 or any other appropriate embodiment of the invention. Permeate flows as indicated by dashed arrows, 12, on the permeate side of the membranes and is drawn into the permeate collection pipe, where it merges with the collected permeate from the other modules in the chain. Obviously, although the drawing shows three modules, any convenient number may be joined in this way. It should be noted that neither the configuration of FIG. 18 nor that of FIG. 19 provides or could operate with a permeate sweep. Even if gas were passed into the pipe at one end, this gas would flow down the unobstructed pipe and out at the other end, without entering the membrane envelope to any extent.

Figure 3:
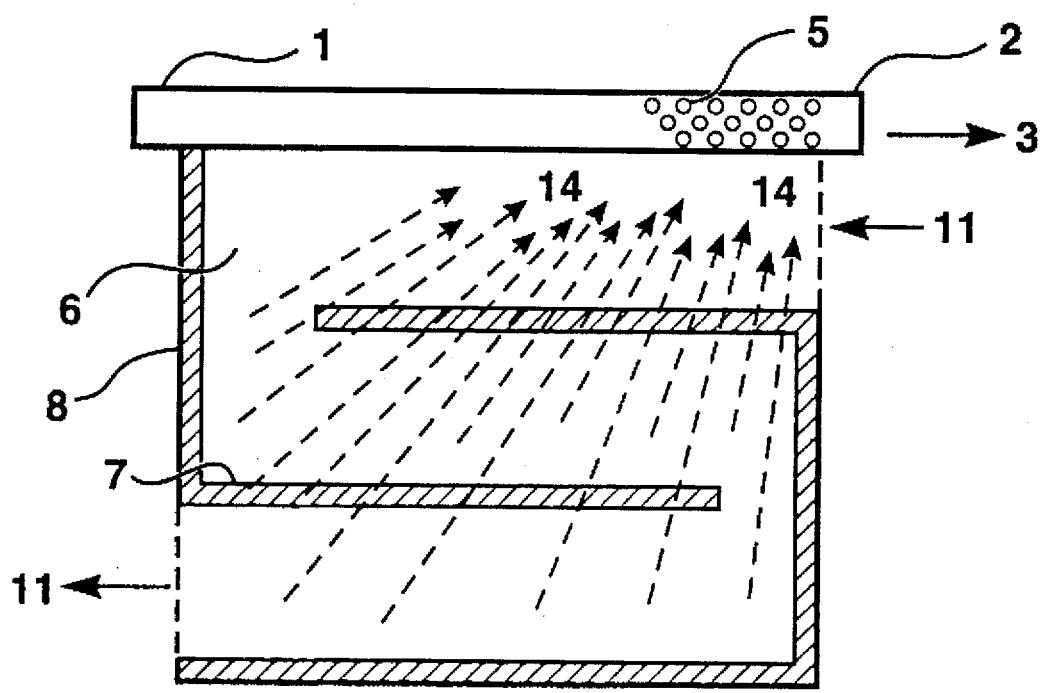
FIG. 3 is a schematic diagram showing directions of feed and permeate flow in a two-baffled module with feed channel inlet close to the permeate pipe, and perforations only at the end of the permeate pipe nearer the feed inlet.

FIG. 3 shows an alternative embodiment with which a higher degree of counter-current flow between the feed and permeate streams can be achieved if desired. The arrows indicating the direction of feed flow have been omitted. This embodiment differs from the embodiments of FIGS. 1 and 2 in the direction of permeate flow, indicated generally by arrows, 14. As can be seen, the permeate pipe, 1, contains perforations, 5, only in the vicinity of end, 2, of the pipe. Thus the permeate that passes through the membrane towards the residue end of the module has to flow back towards the feed end to exit.

In FIG. 3, access to the permeate pipe is provided by multiple perforations. It will be appreciated by those of skill in the art that fewer perforations than shown, or even a single large opening, may suffice in this embodiment.

The permeate flow now has a flow vector that is radially inward, as before, plus a new flow vector that is parallel to the permeate pipe in a direction from left to right as the figure is viewed on the page. The feed flow has a flow vector that is radially outward, plus a flow vector that is parallel to the permeate pipe in a direction from right to left as the figure is viewed on the page. There is, therefore, a high degree of counter-current effect.

Figure 4:
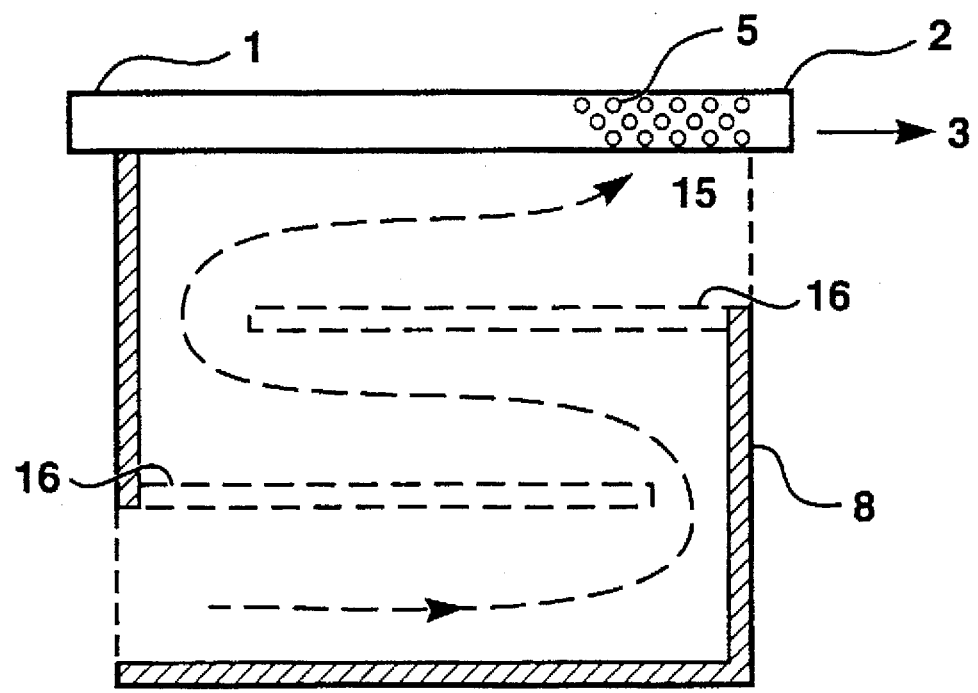
FIG. 4 is a schematic diagram showing directions of feed and permeate flow in a two-baffled module with feed channel inlet close to the permeate pipe, perforations only at the end of the permeate pipe nearer the feed inlet, and a second set of baffles in the permeate channel.

Essentially complete counter-current flow can be provided, if desired, by placing baffles in the permeate channel in the same positions as in the feed channel. FIG. 4 shows such an embodiment, where the two baffles, 16, on the permeate side would match the FIG. 1 arrangement of feed baffles. In this case, gas permeating the membrane is constrained to flow on the permeate side in the general direction indicated by path, 15. The baffles on the permeate side lengthen the permeate channel and, in some circumstances, may increase the pressure drop in the channel to such an extent that the advantages brought about by the counter-current flow mode are substantially reduced or even lost completely. Thus, such embodiments are not necessarily better than the simple configurations of FIGS. 1–3.

Figure 5:
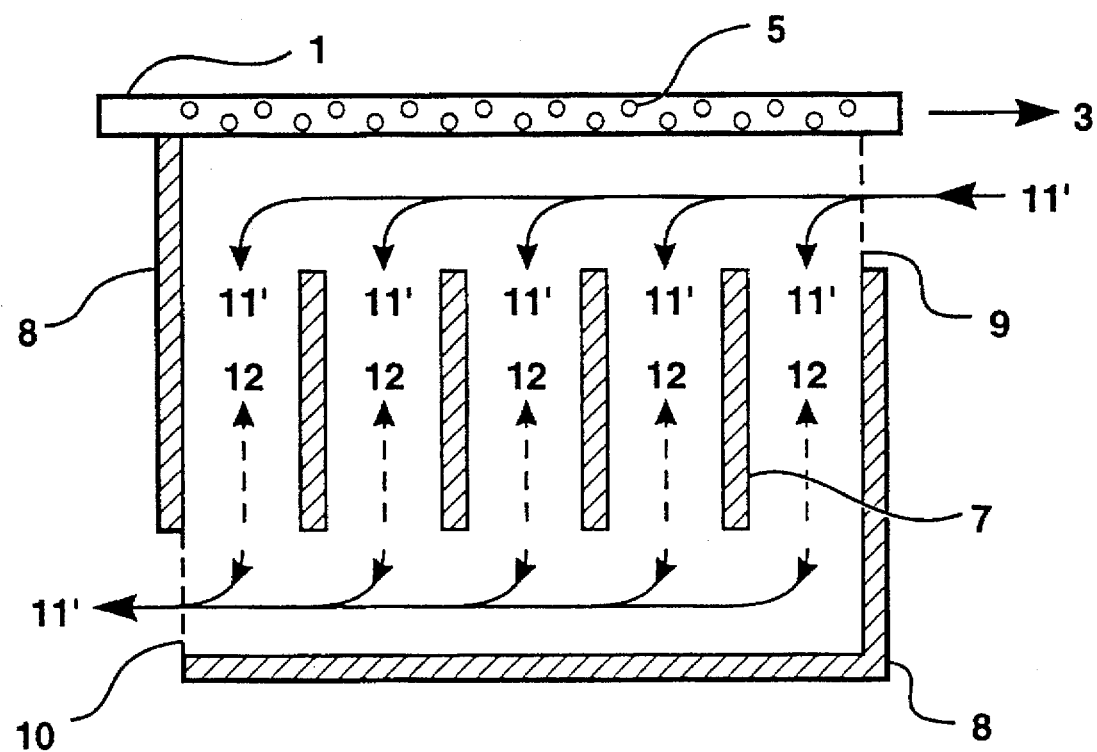
FIG. 5 is a schematic diagram showing directions of feed and permeate flow in a module with baffles in the feed channel perpendicular to the permeate pipe.

Yet another optional arrangement for achieving counter-current flow is shown in FIG. 5. Referring now to this figure, four baffles, 7, are positioned in the feed channel at least approximately perpendicular to the permeate pipe. The baffles terminate generally in the positions shown, so that the feed gas flow pattern is as shown by arrows, 11'. As with the previous embodiments, this induces a component of radially outward flow to the feed stream, counter-current to the generally radially inward flow of the permeate. This embodiment differs from the arrangements of FIGS. 1 and 2, however, in that the segments of the feed channel created by the baffles are parallel to one another, rather than being connected in series. Thus, this arrangement does not reduce the width of the feed channel (except slightly, by the space occupied by the baffles themselves) compared with an unbaffled module. Any benefits that derive from narrowing the feed channel, and hence raising the feed velocity within the module, as explained above, are therefore not available with this design.

As shown in FIG. 3, the permeate flow pattern in the FIG. 5 embodiment may optionally be modified by restricting access to the permeate collection tube to one end of the tube. The modules may also be housed together and connected by a single permeate pipe, as in FIG. 19, or the permeate may be withdrawn from both end of the permeate pipe as in FIG. 18.

Figure 6:
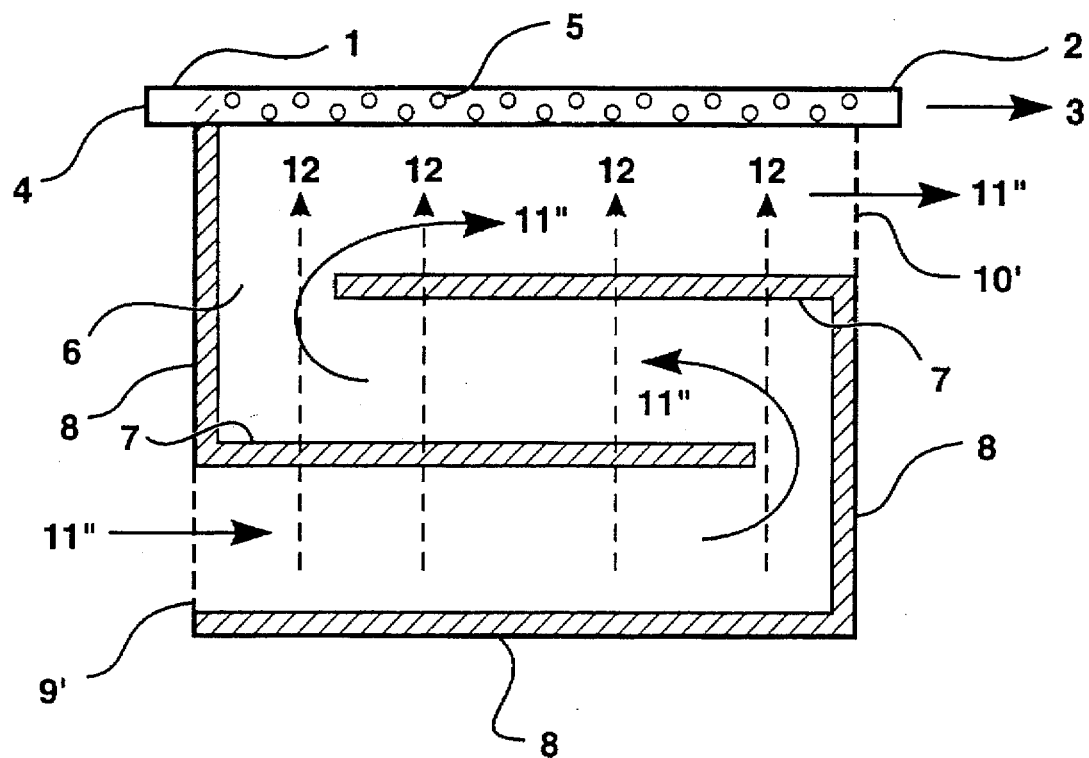
FIG. 6 is a schematic diagram showing directions of feed and permeate flow in a module with baffles in the feed channel parallel to the permeate pipe, but not in accordance with the invention.

It is important that the modules of the invention be constructed and the processes operated so as to provide at least partial counter-current flow. For example, a spiral-wound module design that has baffles substantially as in FIG. 1, but in which the positions of the feed inlet and outlet ports are reversed, so that the module is not in keeping with the invention, is shown in FIG. 6. Referring now to this figure, the feed inlet port, 9', is positioned close to the outer edge of the membrane sheet, and will be at the periphery of the module when rolled. The feed outlet port, 10', is positioned close to the permeate pipe. Thus the feed gas stream flows in the direction indicated by arrows, 11", and has a flow vector that is radially inward, in other words co-current with the permeate stream. There is thus no counter-current flow component whatsoever, and, unless other compensating factors were present, this design would normally give poorer performance than either the arrangements of the invention or the conventional cross-current flow design of a spiral-wound module.

FIGS. 1–5 show embodiments of the invention in which the baffles are placed parallel to one another, and either generally parallel, or generally perpendicular, to the long axis of the module, that is, the permeate pipe. It will be apparent to those of skill in the art that variations are possible, such as aligning the baffles at an angle between 0° and 90° to the permeate pipe, or aligning the baffles at angles to each other, without departing from the spirit and scope of the present invention.

Optionally, the invention may be combined with the invention of co-owned and co-pending Ser. No. 08/537,271, which describes modules having baffles spaced progressively closer to one another, to progressively reduce the width of the feed channel from the feed to the residue end. Such designs can maintain a gas stream velocity along the length of the feed channel that is close to the velocity at the feed inlet. This avoids or reduces loss of performance due to concentration polarization brought about by low feed-flow rates as the feed stream becomes depleted of material.

Having been rolled, the modules of the invention can be housed singly or multiply in vessels as is known in the art.

An important aspect of the invention is that it provides counter-current membrane gas-separation processes. In such a process, the feed gas containing the components to be separated enters the module at the feed inlet port, flows along the feed channel in contact with the membrane and exits as the residue stream through the feed outlet port. Gas that has permeated the membrane flows to the permeate collection pipe and is withdrawn through the open end or ends of the pipe, in accordance with FIGS. 1, 2, 3, 18 or 19, for example. The permeate stream is enriched, and the residue stream is depleted, in at least one component compared with the feed gas. The permeate is undiluted, by which we mean that it is not mixed with a sweep gas. The driving force for transmembrane permeation may be provided by a compressor in the feed line, a vacuum pump in the permeate line, or in any other convenient manner known to the art. Any type of gas separation, including, but not limited to, oxygen/nitrogen separation, removal of organic vapors from air or other gases, removal of hydrogen from offer gases, removal of carbon dioxide from methane or other gases, natural gas processing, treatment of chemical or petrochemical process streams, and dehydration, may be carried out within the scope of the invention.

The counter-current flow processes of the invention are particularly beneficial in separations characterized by a high selectivity between the components being separated, such as at least about 50, at least about 100 or at least about 200 or more, especially when the selectivity exceeds the available pressure ratio. As described in U.S. Pat. No. 5,089,033, FIG. 1 and columns 11 and 12, for example, there is a known relationship between membrane selectivity $\alpha$ and pressure ratio $\phi$ (total feed pressure/total permeate pressure), such that at low pressure ratios, that is when $\phi<<\alpha$, the enrichment obtained in a separation is pressure ratio-limited and is essentially independent of the membrane separation capability. Conversely, at high pressure ratios, that is when $\phi>>\alpha$, the enrichment obtained is membrane separation-limited and is essentially independent of the pressure ratio. Thus, to take advantage of high membrane separation capability, it is desirable to operate at the highest convenient pressure ratios. If the pressure ratio is less than the membrane selectivity, and particularly substantially less, such as two times less, five times less or an order of magnitude less, for example, the separation performance is controlled to an increasing degree by the pressure ratio and the high intrinsic separation capability of the membrane is not utilized. Depending on the membrane selectivity, the pressure ratio at which this effect is felt may be a pressure ratio of less than 50, less than 20, less than 10 or less than 5, for example.

For example, in dehydration of natural gas, water vapor/methane selectivities of 200, 500 or more are commonplace. Because the maximum convenient feed:permeate pressure ratio across the membrane is often of the order only 10 or 50, the separation performance can be severely restricted by the pressure ratio. Counter-current flow modules are particularly suited to this type of separation, because the counter-current permeate promotes better use of the high membrane selectivity. Besides the dehydration of natural gas, other examples of such separations where pressure ratio, not intrinsic membrane separation properties, may be the limiting factor are dehydration of other gases, in particular air, separation of hydrogen from nitrogen or methane, separation of hydrogen sulfide from methane and separation of organic vapors from air.

Figure 17:
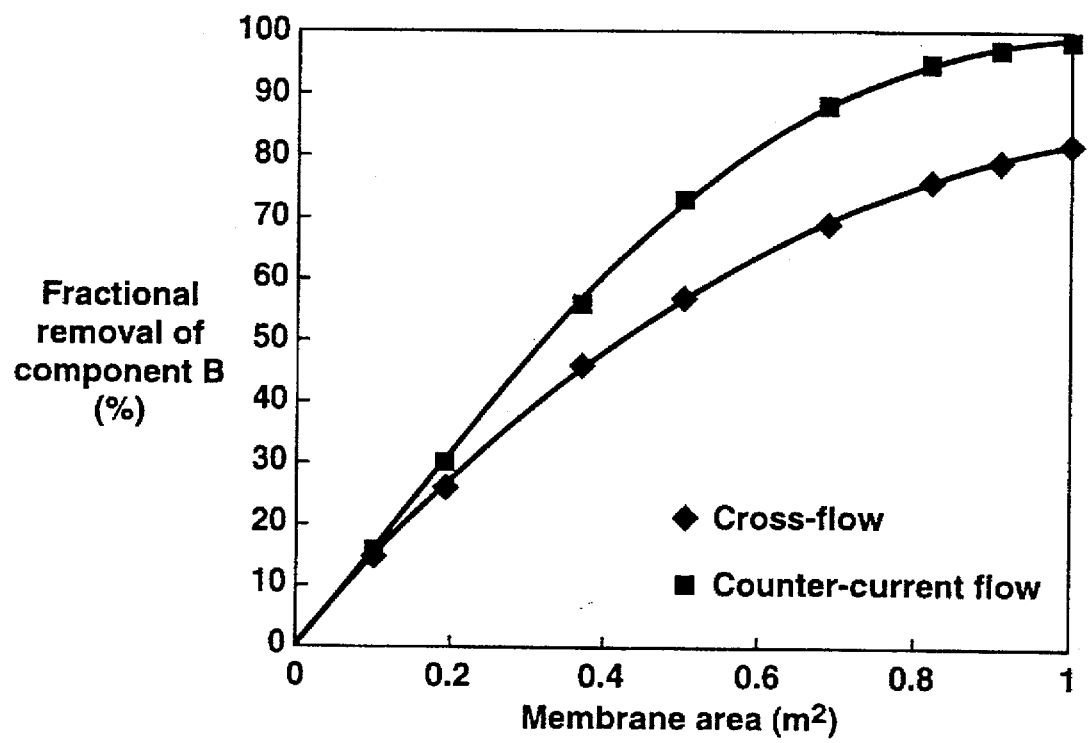
FIG. 17 is a graph showing calculated fractional removal of a rapidly permeating component B from a feed gas mixture of 1% B in another gas A, as a function of the membrane area in the module and the type of flow in the module.

The processes of the invention are beneficial in situations where a high degree of removal of one component from the feed stream is sought. The enhanced separation achieved by the counter-current flow design becomes more noticeable as the degree of removal of the more rapidly permeating component increases. FIG. 17, discussed in more detail in Example 16, shows the calculated fractional removal of a rapidly permeating component B from a feed gas mixture of 1% B in another gas A, as a function of the membrane area in the module and the type of flow in the module. Under the conditions of the example, which are typical of many separations, a conventional cross-flow module can achieve between 15% and 82% removal of component B, depending on the membrane area in the module. Using the counter-current modules of the invention, removals of between 16% and 98.5% are achieved. At low membrane area, there is not much difference between the results (15% or 16% removal) obtained with the conventional process and the counter-current process. As the membrane area, and hence the removal, rises, the difference becomes much more significant (82% removal for the conventional process, versus 98.5% for the process of the invention). Using the modules and processes of the invention, it is possible, depending also on other process parameters, to achieve removals of 99% or better in situations where this would not be possible with a conventional module and process.

The most preferred baffled module, therefore, has a membrane area large enough that, when combined with a counter-current flow pattern, a high degree of removal of the faster permeating component, such as at least 50%, preferably at least 80%, more preferably at least 90%, and most preferably at least 99%, can be achieved.

The processes of the invention are also particularly useful in treating small streams, such as less than about 10 scfm, which it is difficult to treat satisfactorily using a conventional module in which the width of the flow channel is the whole width of the membrane envelope. With a wide feed channel and a low gas flow rate, the resulting feed velocity in the module is slow, leading to concentration polarization and loss of performance, which often manifests as a much lower selectivity than the membrane is inherently capable of. By incorporating baffles in the feed channel, as shown in FIGS. 1 and 2, for example, the feed velocity is increased in proportion to the number of segments, as explained above. By using the modules and processes of the invention, therefore, the separation performance can be maintained at or close to the inherent separation capacity of the membrane.

The modules and processes of the invention have so far been described as they relate to gas separation. The same counter-current flow arrangements can also be used for pervaporation, where conventional cross-flow spiral-wound modules are in current use. Pervaporation modules can be constructed following the teachings set forth above, using pervaporation membranes and spacers, but otherwise assembling the modules as generally shown in FIGS. 1–5 and the accompanying text. As with the gas-separation modules and processes, the permeate flow through the permeate pipe may be as in FIG. 1, FIG. 18 or FIG. 19.

In pervaporation, the feed and residue streams are liquid and the permeate stream is a gas or vapor. Nevertheless, we believe in many cases the performance of pervaporation systems will be improved by adopting the counter-current flow designs taught herein. The modules of the invention can be used to carry out pervaporation processes that include removal of organic compounds from water, dehydration of water-containing liquids, and separation of organic mixtures.

The invention is now further illustrated by the following examples, which are intended to be illustrative of the best mode of carrying out the invention, but are not intended to limit the scope or underlying principles of the invention in any way.

EXAMPLES

Example 1

Construction of Baffled Modules with Silicone Rubber Membrane

Five spiral-wound modules were constructed. The composite membrane was folded into a rectangular envelope and, with feed and permeate spacer material in place, the membrane envelope was glued and wound around a permeate collection pipe. Three modules were made with baffles in the feed channel. Two unbaffled modules were constructed for comparative testing. Each module contained about 1 m$^2$ of a 4-μm-thick silicone rubber composite membrane. The baffles were formed by applying extra glue lines on the feed spacer material at appropriate positions within the feed channel. The feed spacer material was a coarse-mesh polypropylene, 0.02 mil thick (spacer A) and 0.05 mil thick (spacer B). The modules were formed with two and four parallel baffles, as shown in FIGS. 1 and 2. Module specifications are summarized in Table 1.

TABLE 1

| Module Number | Membrane Area (m$^2$) | Feed Spacer Type | Baffle Configuration | Estimated Increase in Feed Channel Velocity* |
|---|---|---|---|---|
| 1 | 1.14 | A | None | 0 |
| 2 | 1.04 | A | Parallel | 3× |
| 3 | 1.11 | B | None | 0 |
| 4 | 1.09 | B | Parallel | 3× |
| 5 | 0.95 | B | Parallel | 5× |

*Relative to unbaffled module with the same feed spacer

Example 2

Module Performance with CFC-113

The modules were tested in a bench-scale test system equipped to measure feed, residue, and permeate flow rates and pressures. The permeate pressure was adjusted by a throttle valve on the permeate side of the membrane. Stream compositions were analyzed by gas chromatography, and the data were used to calculate normalized fluxes and selectivities by means of an in-house cross-current flow computer model.

The selectivities that are reported in for this and other examples are a function of the operating conditions and the module type, because the selectivities are calculated from permeation equations that ignore concentration polarization effects and that are valid for cross-current flow conditions. Under these conditions, therefore, counter-current flow effects manifest themselves as a higher selectivity as compared to a module without baffles.

Figure 7:
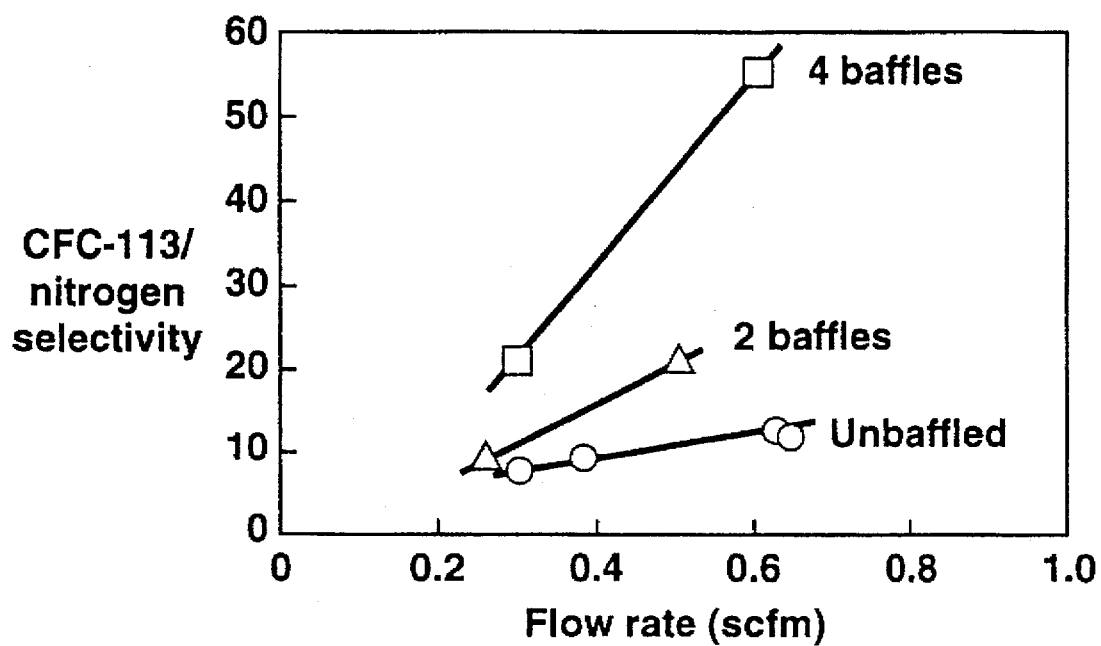
FIG. 7 is a graph of CFC-113/nitrogen selectivity as a function of feed flow rate for baffled and unbaffled modules.

Experiments were carried out with modules number 3, 4, and 5, using a gas mixture of 1 vol % CFC-113 in nitrogen, and different feed flow rates. The selectivity of the modules as a function of feed flow rate is plotted in FIG. 7. As can be seen, the separation performance of the baffled modules was significantly better than the unbaffled module, and the module with four baffles performed significantly better than the module with two baffles.

Example 3

Feed Gas Velocity

Figure 8:
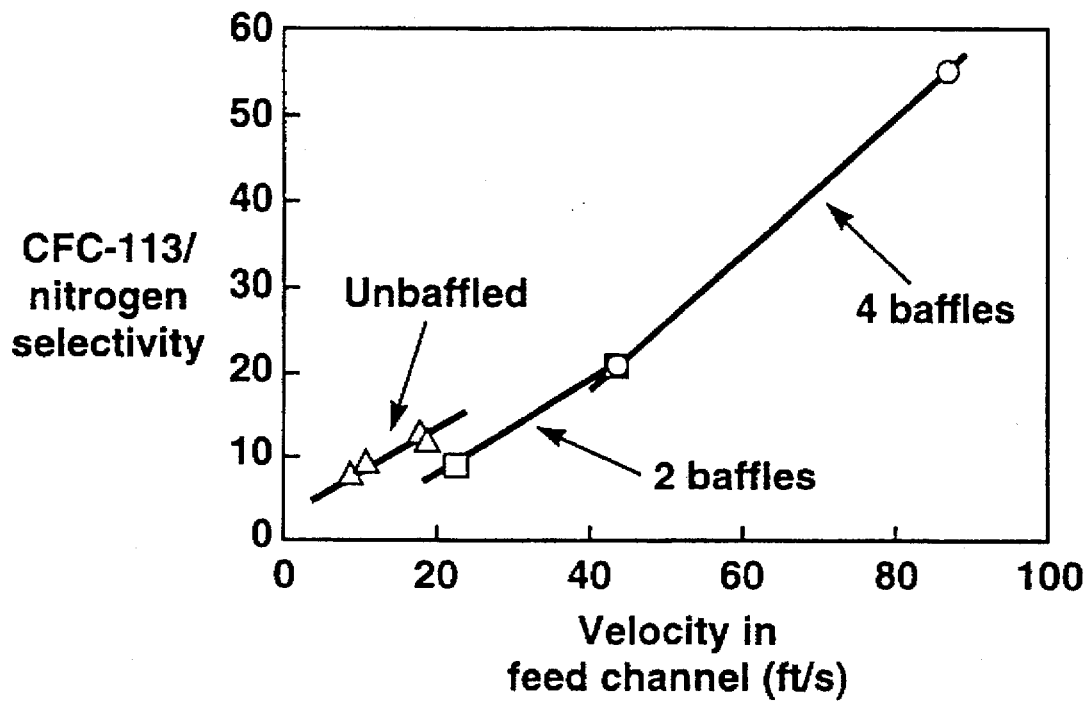
FIG. 8 is a graph of CFC-113/nitrogen selectivity as a function of feed gas velocity for baffled and unbaffled modules.

The experimental data from Example 2 were used to calculate the CFC-113/nitrogen selectivity as a function of the feed gas velocity in the module. The velocity was obtained by dividing the feed flow rate by the cross-sectional area of the feed channel. Because the cross-sectional area is smaller in baffled modules, a given feed flow rate represents a higher velocity in a baffled module than in a module without baffles. The results are shown in FIG. 8. When the data are plotted in this way, the points for all the modules fall more or less onto one line, indicating that the selectivity obtained is proportional to the feed gas velocity in the feed channel.

Example 4

Comparison of Residue Concentrations

Using the experimental data of Example 2, we performed a computer calculation of the CFC-113 residue concentration for the modules, for a feed flow rate of 0.5 scfm and a CFC-113 feed concentration of 1 vol %. The feed pressure was assumed to be 5 psig, and the permeate pressure 50 torr. Table 2 lists the results of the computer calculations.

TABLE 2

| Feed Channel Configuration | Effective Module CFC-113/Nitrogen Selectivity | Residue Concentration (ppmv) |
|---|---|---|
| Unbaffled | 11 | 730 |
| 2 baffles | 20 | 210 |
| 4 baffles | 45 | 37 |

The calculations show that the residue concentration is reduced from 730 ppmv to 37 ppmv by the addition of baffles to the feed spacer. In other words, the removal achieved by the membrane increases from 93% to greater than 99%.

Example 5

Effect of Feed Spacer Thickness

Figure 9:
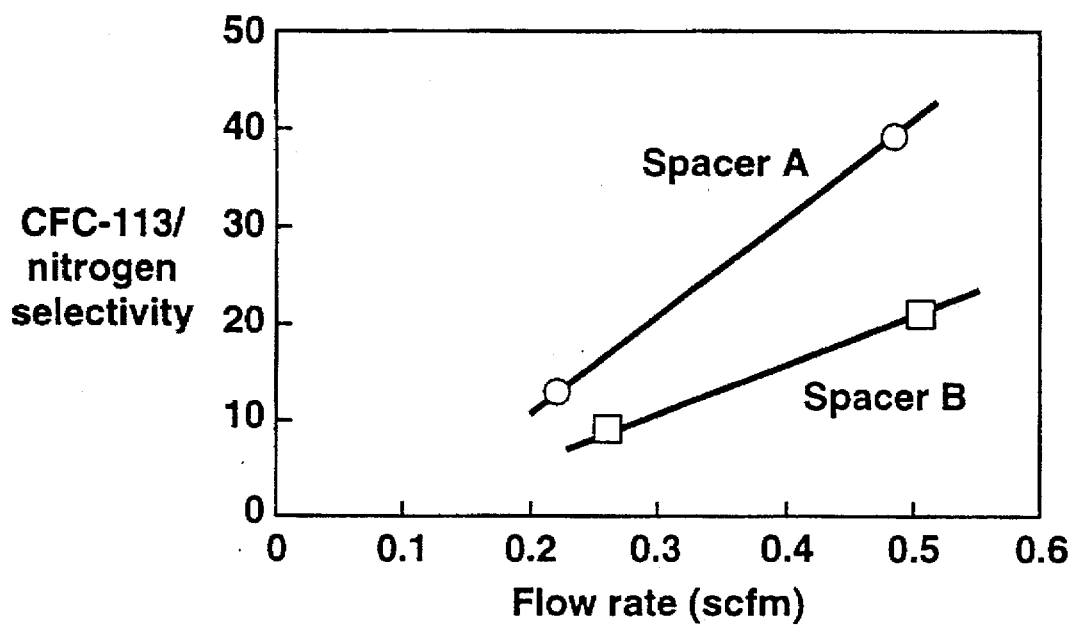
FIG. 9 is a graph showing CFC-113/nitrogen selectivity as a function of feed flow rate for modules containing two different feed spacers.

Module numbers 2 and 4 were tested and their selectivities calculated, using the same general procedures as in Example 2. Both modules contained two baffles, but the feed spacer material in module number 2 was thicker than that in module number 4. FIG. 9 shows the calculated selectivities as a function of feed flow rate. The thicker feed spacer gave a better performance, possibly because the strand configuration promoted greater turbulence in the feed.

Example 6

Effect of Feed Flow Direction

To determine the effect of feed flow direction, several of the modules were tested in a co-current flow direction, not in accordance with the invention. FIG. 6 illustrates this arrangement, in which the feed gas enters at the periphery of the module and exits near the product pipe. This produces a feed flow vector radially inwards, that is, co-current with the permeate flow. Tests were performed and selectivities calculated using the same general procedures as in Example 2.

Figure 10:
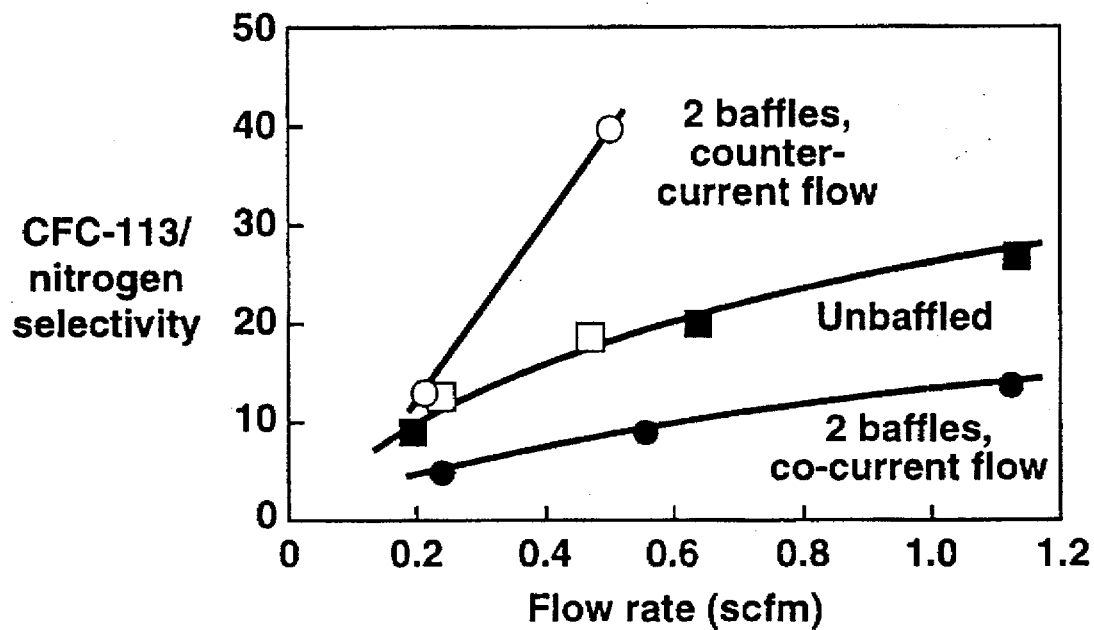
FIG. 10 is a graph showing CFC-113/nitrogen selectivity as a function of feed flow rate for an unbaffled module and for baffled modules operating with co-current flow and counter-current flow.

FIG. 10 compares the performance of module numbers 1 and 2 with both counter-current flow (open data points) and co-current flow (solid data points). The performance of the unbaffled module was not affected by the feed flow direction, but the baffled module performance deteriorated dramatically when the flow was reversed. The co-current flow pattern produced worse separation results than were obtained with the standard, unbaffled cross-flow module.

The experiments were repeated with modules 3 and 4, and similar results were obtained.

Example 7

Module Performance with Hydrocarbon Vapor

Experiments with module numbers 1 and 2 were carried out and selectivities calculated using the same general procedures and operating conditions as in Example 2, with a 1% propane in nitrogen gas mixture. The feed flow rate was varied between about 0.2 and 0.6 scfm.

Figure 11:
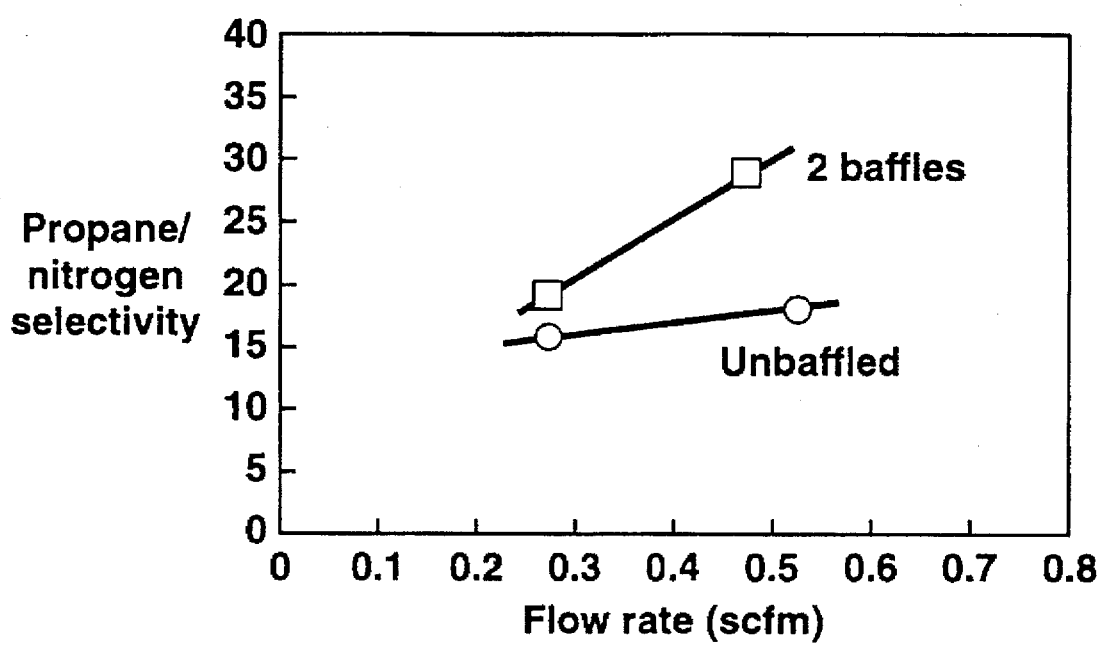
FIG. 11 is a graph of propane/nitrogen selectivity as a function of feed flow rate for baffled and unbaffled modules.

FIG. 11 shows the selectivity as a function of feed flow rate. The selectivity obtained with the baffled module was significantly better than the selectivity obtained with the unbaffled module. The selectivity for both modules increased with increasing feed flow rate.

Example 8

Construction of Baffled Modules with Pebax Membrane

Three bench-scale spiral-wound modules were constructed using a polyamide-polyether block copolymer membrane, sold under the brand name Pebax® (Atochem Inc., Glen Rock, N.J.). The modules were 2 inches in diameter and contained 0.2 m² membrane area. Two modules contained two baffles, providing a counter-current flow pattern, as in FIG. 1, and increasing the velocity (in cm/s) of the feed gas by a factor of three at a constant feed flow rate (in scfm). One of the baffled modules contained an open mesh feed spacer, C; the other contained a finer spacer, D, with a higher number of strands per square inch. A third module, containing no baffles and spacer C, was constructed for comparative testing. The module specifications are shown in Table 3.

TABLE 3

| Module Number | Baffles | Feed Spacer | Membrane Methane Pressure-Normalized Flux ($10^{-6}$ cm³(STP)/cm² · s · cmHg) |
|---|---|---|---|
| 1 | No | C | 5.9 |
| 2 | Yes | C | 4.2 |
| 3 | Yes | D | 4.2 |

Example 9

Module Performance in Dehydrating Natural Gas

The three modules were tested in a bench-scale gas separation test apparatus, generally as described in Example 2 above, using model natural gas streams containing methane and water vapor. The composition of the various streams was analyzed with an on-line humidity analyzer (Vaisala Humidity Probe, HMP 201) and a gas chromatograph. Experiments were carried out at room temperature with the methane essentially saturated with water vapor (800 ppmv) at a feed pressure of 615 psig. The flow rate was varied between 2.1 and 11 scfm, which yielded a stage cut (permeate flow rate/feed flow rate) of 0.5–7%.

The performance of the modules was characterized by the water vapor removal achieved. The percentage removed is defined as the amount of water present in the permeate stream divided by the amount of water present in the feed stream times 100%. The cross-current flow computer model was then used to calculate the normalized fluxes of water vapor and the other natural gas components. The effective water vapor/methane selectivity was calculated as a ratio of the normalized fluxes of water vapor and methane.

Figure 12:
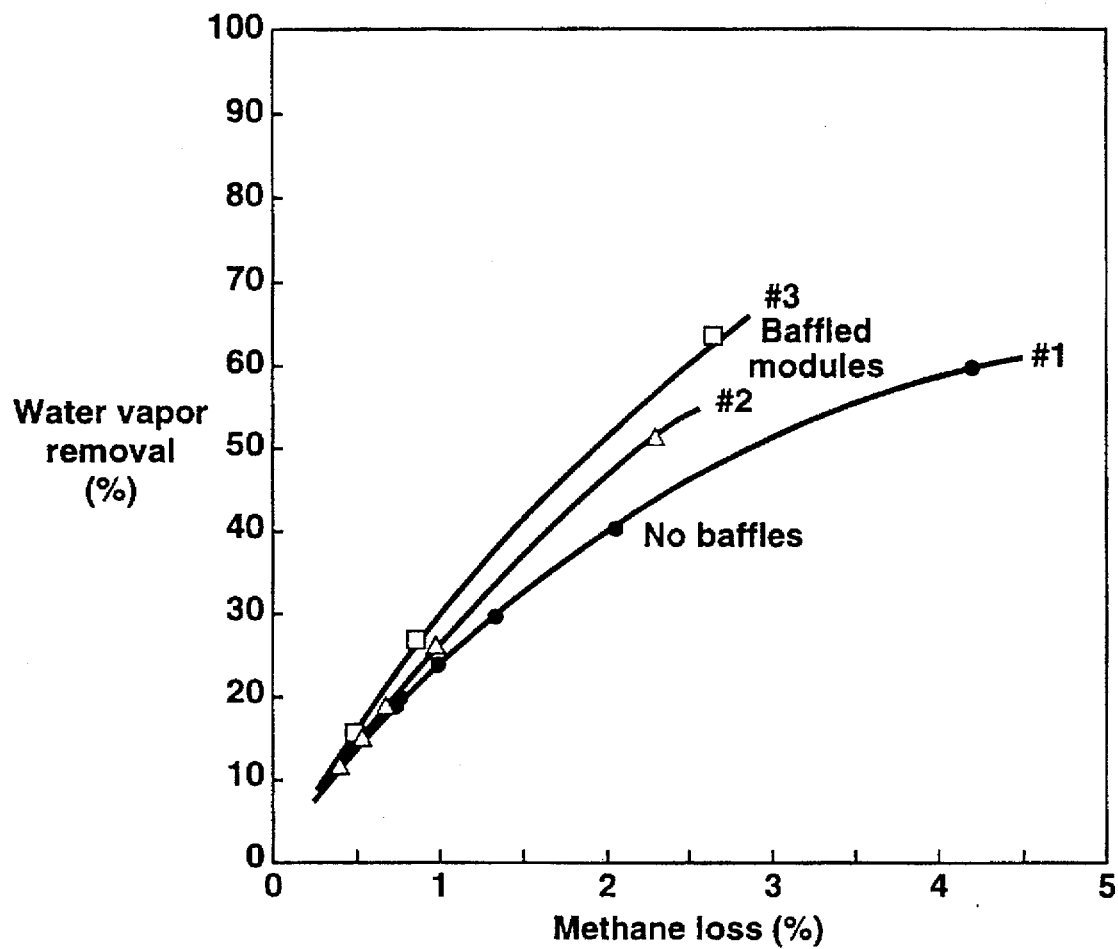
FIG. 12 is a graph of water vapor removal rate as a function of methane lost from the feed gas at 610 psig for baffled and unbaffled modules.

FIG. 12 shows the water vapor removal as a function of methane loss from the feed into the permeate. The baffled modules had a significantly higher water removal efficiency at a given methane loss than the conventional module. In other words, if baffled modules were used to dehydrate natural gas or methane, instead of unbaffled modules, less methane would be lost. The best performance was obtained with the module containing the tighter-woven feed spacer.

Example 10

The modules were tested using the same general procedures and the same test parameters as in Example 9, except that the feed pressure was 1,000 psig, at which pressure the feed is saturated at 500 ppmv water vapor.

Figure 13:
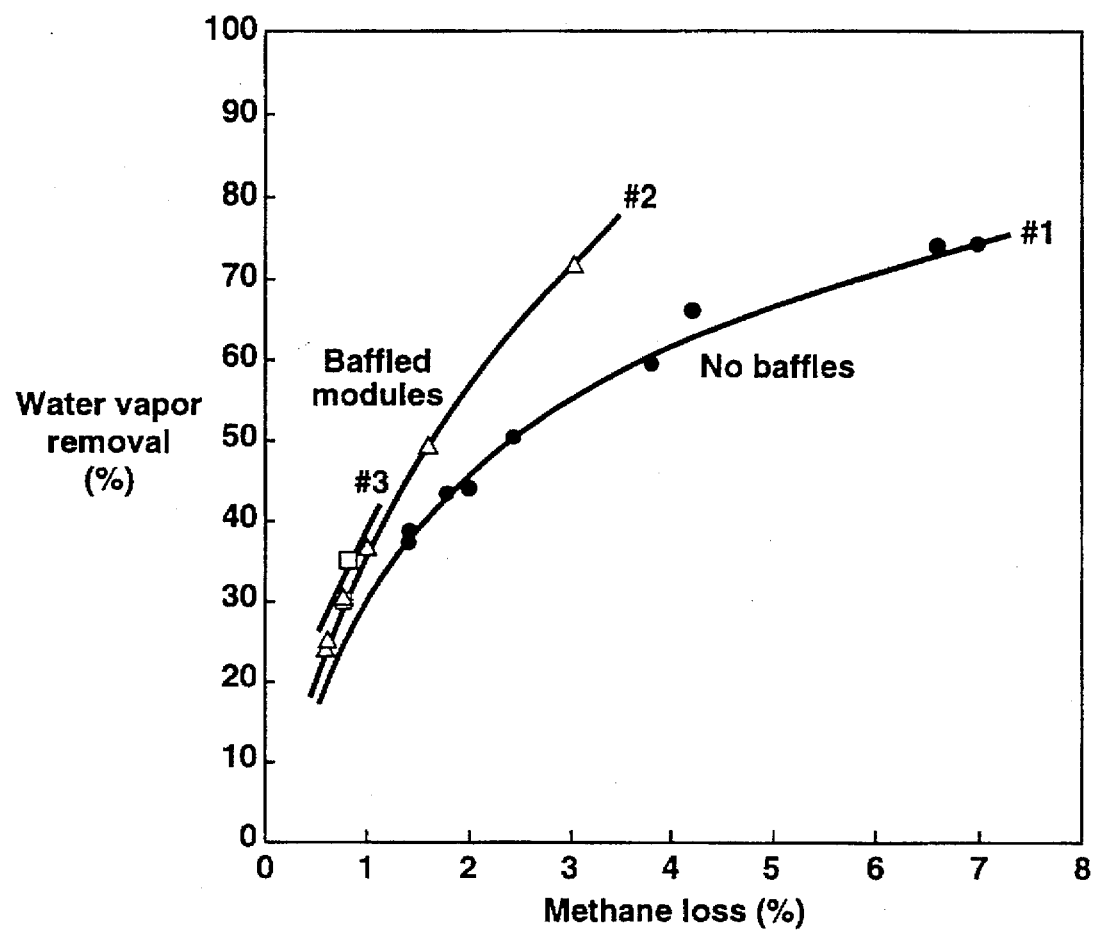
FIG. 13 is a graph of water vapor removal rate as a function of methane lost from the feed gas at 1,000 psig for baffled and unbaffled modules.

FIG. 13 shows the water vapor removal as a function of methane loss from the feed into the permeate. As before, a given water removal could be achieved with a lesser loss of methane using the baffled modules.

Example 11

Figure 14:
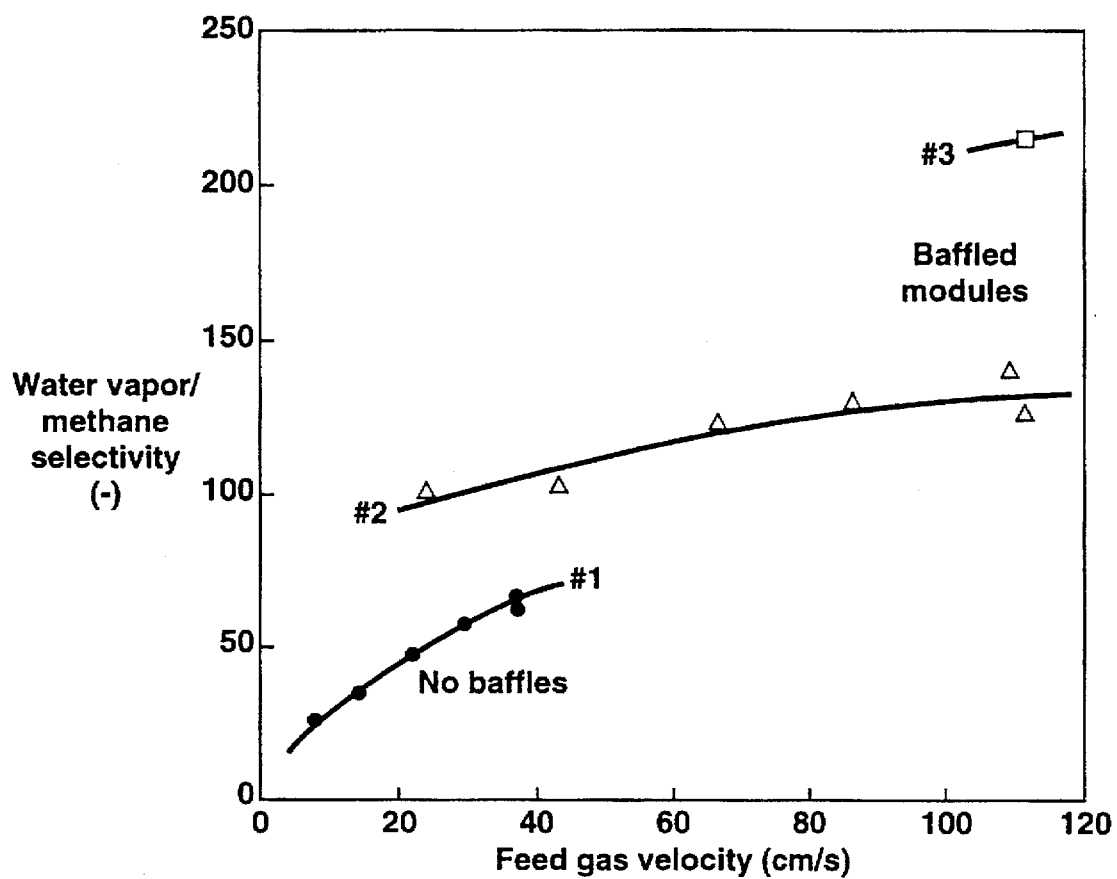
FIG. 14 is a graph of water vapor/methane selectivity as a function of feed gas velocity for baffled and unbaffled modules.

Experiments as described in Example 9 were carried out with the three modules, to measure the water vapor/methane selectivity as a function of feed gas velocity in the feed channel. The velocity was obtained by dividing the feed flow rate by the cross-sectional area of the feed channel. The results were calculated and analyzed as in Examples 2 and 9. FIG. 14 shows the results.

At the same feed gas velocity within the feed channel, the baffled modules achieved a higher calculated selectivity than the unbaffled module. This difference is attributable to counter-current flow effects.

The selectivity data in FIG. 14 show that the dependence of selectivity on feed velocity is smaller for baffled module #2 than for unbaffled module #1. In both modules, a reduction in feed velocity exacerbates concentration polarization and reduces selectivity. In the baffled module, however, this effect is mostly offset, because the slower feed velocity increases water vapor removal from the feed, which increasses the counter-flow effect. The same phenomena explain the large difference in performance between baffled modules #2 and #3; the gas velocity in module #3 is actually higher than as calculated, because we did not take into account the cross-sectional area of flow channel occupied by the spacer. The high velocity means that this module is less affected by concentration polarization, which leads to better water vapor removal, which in turn magnifies the counter-flow effect.

Example 12

Effect of Feed Pressure

Figure 15:
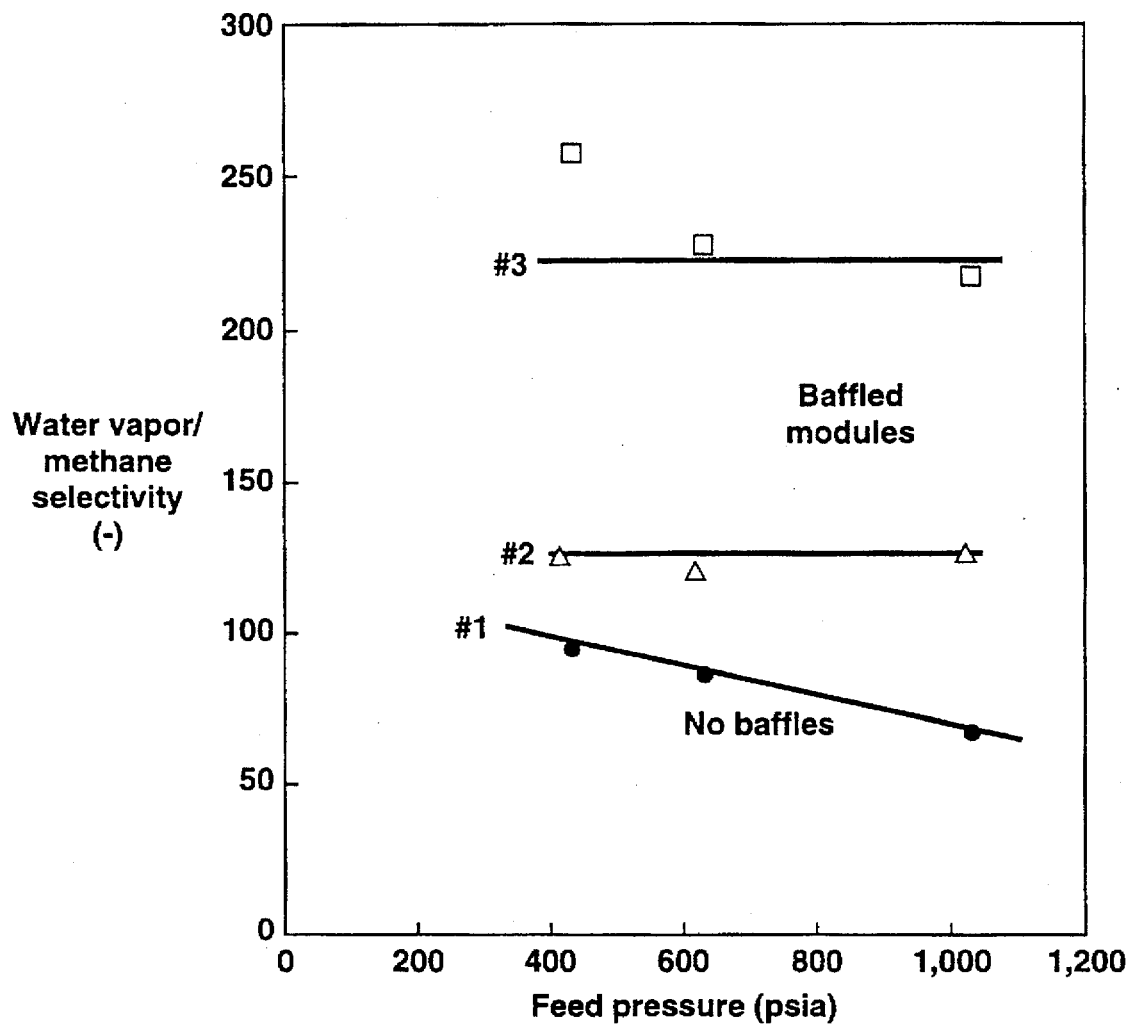
FIG. 15 is a graph of water vapor/methane selectivity as a function of feed pressure for baffled and unbaffled modules.

The three modules were tested and the results analyzed according to the general procedures of Example 9, at feed pressures of 400, 600, and 1,000 psig, at room temperature. The feed flow rate was constant at 10–11 scfm, which means that the feed gas velocity decreases as the feed pressure increases. FIG. 15 shows the water vapor/methane selectivity as a function of feed pressure. The effective selectivity of the unbaffled module decreases as the feed pressure increases, whereas that of the baffled modules is essentially independent of feed pressure.

Example 13

Effect of Permeate Pressure

Figure 16:
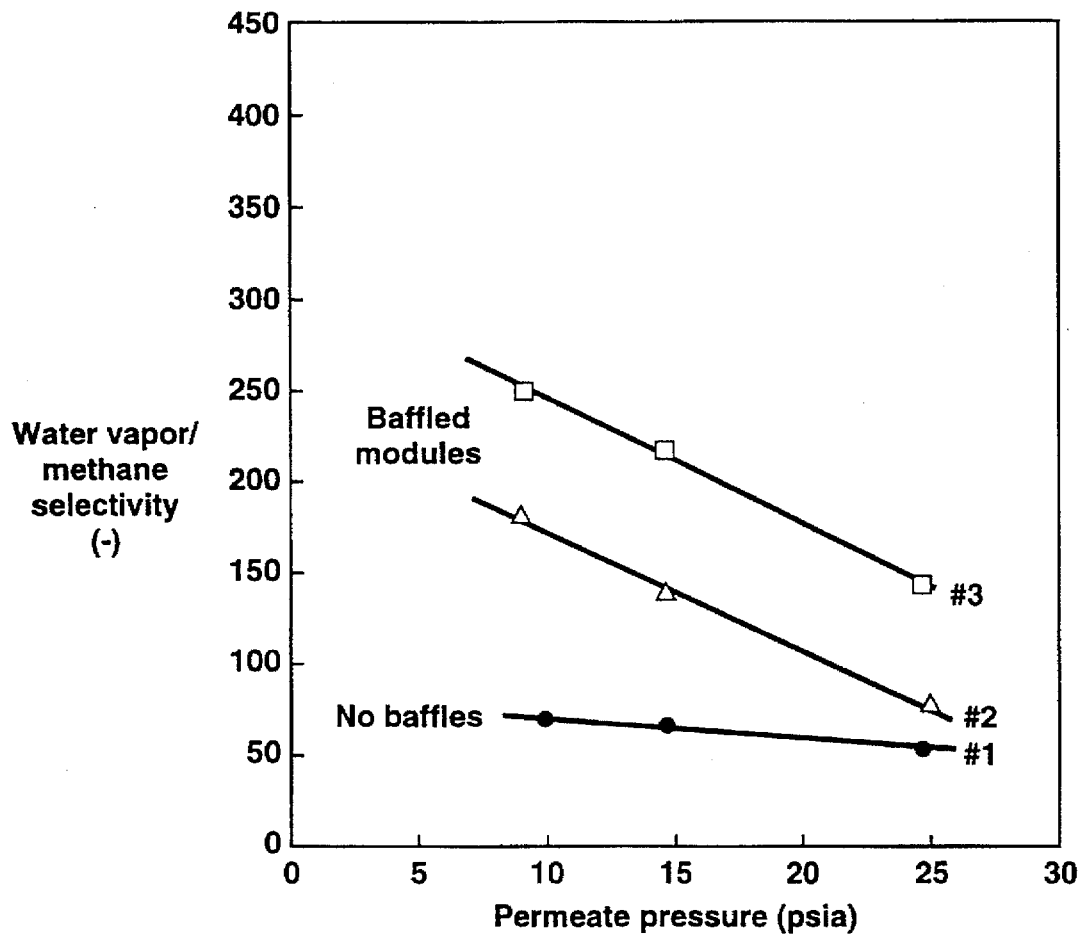
FIG. 16 is a graph of water vapor/methane selectivity as a function of permeate pressure for baffled and unbaffled modules.

The modules were tested and the results analyzed according to the general procedures of Example 9, at 1,000 psig feed pressure, at room temperature, and a feed flow rate of 10–11 scfm. Measurements were made at permeate pressures of 10, 15, and 25 psia. FIG. 16 shows the effective water vapor/methane selectivity as a function of permeate pressure. Water removal increases with decreasing permeate pressure, which increases the influence of counter-current flow effects and thereby causes the increase in calculated selectivity.

Example 14

Effect of Presence of Carbon Dioxide and Higher Hydrocarbons

Experiments were conducted and the results calculated according to the general procedures of Example 9, using a model natural gas stream containing 1.5% carbon dioxide, 3.9% propane, 2.0% n-butane, balance methane, and saturated with water vapor. The feed pressure was 1,000 psig, and the feed flow rate was constant at 9–11 scfm.

The results are compared with similar experiments for feed streams containing only methane and water vapor in Table 4.

The higher hydrocarbons and carbon dioxide are more permeable than methane, and, as can be seen from the table, their presence in the gas stream increases the water removal efficiency. The water vapor removal increases because the carbon dioxide and the higher hydrocarbons act as a counter-current sweep on the permeate side, which increases the permeation driving force for water vapor. Co-permeation of carbon dioxide is especially beneficial, because it reduces the hydrocarbon content of the permeate, thereby reducing the loss of methane.

TABLE 4

| Feed Gas Composition | Water Vapor Removal at 1,000 psig and 9–11 scfm (%) |
| --- | --- |
| Module #1 (no baffles) | |
| 525 ppmv water vapor. Balance methane | 38 |
| 525 ppmv water vapor, 1.5% $CO_2$, 3.9% propane, 2.0% n-butane. Balance methane | 42 |
| Module #2 (baffled) | |
| 550 ppmv water vapor. Balance methane | 28 |
| 530 ppmv water vapor, 1.1% $CO_2$, 2.9% propane, 1.1% n-butane. Balance methane | 34 |
| 540 ppmv water vapor, 8.5% $CO_2$. Balance methane | 41 |
| Module #3 (baffled) | |
| 500 ppmv water vapor. Balance methane | 33 |
| 510 ppmv water vapor, 1.4% $CO_2$, 3.2% propane, 1.4% n-butane. | 42 |

TABLE 4-continued

| Feed Gas Composition | Water Vapor Removal at 1,000 psig and 9–11 scfm (%) |
| --- | --- |
| Balance methane | |

Example 15

Multicomponent Permeation Experiments

The selectivities for carbon dioxide and higher hydrocarbons over methane were calculated from the experiments reported in Example 14. The higher hydrocarbon selectivities are modest. At 90% water removal, sufficient for most pipeline specifications, less than 10% of the higher hydrocarbons are permeated. The calculated selectivities are reported in Table 5.

TABLE 5

| | Selectivity (–) | | |
| --- | --- | --- | --- |
| Module | $CO_2$/Methane | Propane/Methane | n-Butane/Methane |
| #1 (no baffles) | 5.6 | 2.0 | 3.0 |
| #2 (baffled) | 8.4 | — | — |
| | 7.3 | 7.8 | 2.3 |
| #3 (baffled) | 5.6 | 2.4 | 4.0 |

Example 16

A calculation was performed to compare the performance of modules configured for counter-flow and cross-flow, and containing membrane areas ranging from 0.1 m² to 1.0 m². The larger the membrane area, the greater is the degree of removal of the faster-permeating component of the feed. Thus, the calculation effectively compares the performance of the two module configurations at different degrees of component removal.

The feed gas was assumed to be a two-component mixture of 1 vol % of a rapidly permeating component B in a more slowly permeating component A. Other assumptions were as follows:

| | |
| --- | --- |
| Feed flow rate: | 50 L/h |
| Feed pressure: | 10 bar |
| Permeate pressure: | 1 bar |
| That is, pressure ratio: | 10 |
| Permeability of A: | 1 L/m² · h · bar |
| Permeability of B: | 100 L/m² · h · bar |
| That is, selectivity B/A: | 100 |

Since the pressure ratio is 10 and the selectivity is 100, this separation is substantially pressure-ratio limited.

The results of the calculation are listed in Table 6 and shown graphically in FIG. 17.

TABLE 6

| Configuration | Cross-flow | | | Counter-flow | | |
|---|---|---|---|---|---|---|
| Membrane area (m2) | % B in permeate | % B in residue | Removal % | % B in permeate | % B in residue | Removal % |
| 0.10 | 8.4 | 0.85 | #5 | 8.9 | 0.84 | 16 |
| 0.19 | 7.9 | 0.74 | 26 | 8.7 | 0.70 | 30 |
| 0.37 | 6.9 | 0.54 | 46 | 8.2 | 0.44 | 56 |
| 0.50 | 6.2 | 0.43 | 57 | 7.7 | 0.27 | 73 |
| 0.69 | 5.5 | 0.31 | 69 | 6.8 | 0.12 | 88 |
| 0.82 | 5.1 | 0.24 | 76 | 6.1 | 0.05 | 95 |
| 0.91 | 4.8 | 0.21 | 79 | 5.6 | 0.029 | 97.1 |
| 1.0 | 4.5 | 0.18 | 82 | 5.2 | 0.015 | 98.5 |

The benefits of the invention are particularly clear when high fractional removals of B from the feed stream are sought. Under the conditions of the example, which are typical of many separations, a conventional cross-flow module can achieve between 15% and 82% removal of component B, depending on the membrane area in the module. Using the counter-current-flow modules of the invention, removals of between 16% and 98.5% are achieved. At low membrane areas, and hence low removals, there is not much difference between the results (15% or 16% removal) obtained with the conventional process and the counter-current process. As the membrane area, and hence the removal, rises, the difference becomes much more significant. For example, with a membrane area of 0.5 m$^2$, the conventional cross-flow module reduces the content of B in the stream to 0.43%, which represents 57% removal. On the other hand, the counter-current-flow modules of the invention reduce the amount of B to 0.27%, that is, they obtain 73% removal. With a membrane area of 0.69 m$^2$, the conventional cross-flow module achieves 69% removal, but the counter-current-flow module achieves 88% removal. With a membrane area of 1 m$^2$, the conventional cross-flow module achieves 82% removal, but the counter-current-flow module can now achieve over 98% removal.

We claim:

1. A gas-separation process, comprising:
   (i) providing a spiral-wound membrane module, having at least one feed channel containing a mesh spacer and at least one permeate channel, and adapted, by providing one or more baffles, positioned substantially parallel to a longitudinal axis of the module, in each feed channel, to provide at least partially counter-current feed/permeate flow without a permeate sweep;
   (ii) passing a feed gas stream containing a first and second component along said at least one feed channel in a flow pattern that includes a flow vector that is radially outward with respect to said module;
   (iii) withdrawing from said at least one feed channel a residue gas stream depleted in said first component compared with said feed gas stream;
   (iv) withdrawing from said at least one permeate channel an undiluted permeate gas stream enriched in said first component compared with said feed gas stream.

2. The process of claim 1, wherein:
   (a) said baffles are aligned substantially lengthwise with respect to said module, thereby dividing said at least one feed channel into at least two segments connected in series; and wherein:
   (b) said feed channel is connected to a feed inlet port, through which feed gas enters said module, and a feed outlet port, through which residue gas leaves said module, and said feed outlet port is closer to the periphery of said module than is said feed inlet port.

3. The process of claim 2, wherein said baffles are spaced progressively closer to one another, thereby progressively reducing the width of said feed channel from said feed inlet port to said feed outlet port.

4. The process of claim 1, wherein said module contains a perforated central permeate collection pipe having perforations only in the vicinity of one end.

5. The process of claim 1, wherein there are two feed-side baffles.

6. The process of claim 1, wherein there are four feed-side baffles.

7. The process of claim 1, wherein said module contains multiple membranes, multiple feed channels and multiple baffles.

8. The process of claim 1, wherein said first component comprises an organic vapor.

9. The process of claim 1, wherein said first component comprises water.

10. The process of claim 1, wherein said first component comprises hydrogen.

11. The process of claim 1, wherein said first component comprises carbon dioxide.

12. The process of claim 1, wherein said first component comprises hydrogen sulfide.

13. The process of claim 1, wherein said feed gas stream comprises air.

14. The process of claim 1, wherein said feed gas stream comprises natural gas.

15. The process of claim 1, wherein said feed gas stream comprises methane.

16. The process of claim 1, wherein said residue gas stream is depleted in said first component by at least 50% compared with said feed gas stream.

17. The process of claim 1, wherein said residue gas stream is depleted in said first component by at least 80% compared with said feed gas stream.

18. The process of claim 1, wherein said residue gas stream is depleted in said first component by at least 90% compared with said feed gas stream.

19. The process of claim 1, wherein said residue gas stream is depleted in said first component by at least 99% compared with said feed gas stream.

20. The process of claim 1, further characterized in that said module exhibits a selectivity for said first component over said second component of at least about 50.

21. The process of claim 1, further characterized in that said module exhibits a selectivity for said first component over said second component of at least about 100.

22. The process of claim 1, further characterized in that said module exhibits a selectivity for said first component over said second component of at least about 200.

23. The process of claim 1, carried out at a pressure ratio no greater than about 50.

24. The process of claim 1, carried out at a pressure ratio no greater than about 20.

25. The process of claim 1, carried out at a pressure ratio no greater than about 10.

26. The process of claim 1, further characterized in that said module exhibits a selectivity for said first component over said second component that is numerically greater than the pressure ratio at which the process is carried out.

27. The process of claim 1, further characterized in that said module exhibits a selectivity for said first component over said second component that is numerically at least two times the pressure ratio at which the process is carried out.

28. The process of claim 1, further characterized in that said module exhibits a selectivity for said first component over said second component that is numerically at least five times the pressure ratio at which the process is carried out.

29. The process of claim 1, wherein said feed gas stream has a flow rate no greater than about 10 scfm.

30. The process of claim 1, wherein there are six feed-side baffles.

31. A pervaporation process, comprising:

(i) providing a spiral-wound membrane module, having at least one feed channel containing a mesh spacer and at least one permeate channel, and adapted, by providing one or more baffles, positioned substantially parallel to a longitudinal axis of the module, in each feed channel, to provide at least partially counter-current feed/permeate flow without a permeate sweep;

(ii) passing a feed liquid stream containing a first and second component along said at least one feed channel in a flow pattern that includes a flow vector that is radially outward with respect to said module;

(iii) withdrawing from said at least one feed channel a residue liquid stream depleted in said first component compared with said feed liquid stream;

(iv) withdrawing from said at least one permeate channel an undiluted permeate gas stream enriched in said first component compared with said feed gas stream.

32. The process of claim 31, wherein:

(a) said baffles are aligned substantially lengthwise with respect to said module, thereby dividing said at least one feed channel into at least two segments connected in series; and wherein:

(b) said feed channel is connected to a feed inlet port, through which feed liquid enters said module, and a feed outlet port, through which residue liquid leaves said module, and said feed outlet port is closer to the periphery of said module than is said feed inlet port.

33. The process of claim 32, wherein said baffles are spaced progressively closer to one another, thereby progressively reducing the width of said feed channel from said feed inlet port to said feed outlet port.

34. The process of claim 31, wherein said module contains a perforated central permeate collection pipe having perforations only in the vicinity of one end.

35. The process of claim 31, wherein there are two feed-side baffles.

36. The process of claim 31, wherein there are four feed-side baffles.

37. The process of claim 31, wherein said module contains multiple membranes, multiple feed channels and multiple baffles.

38. The process of claim 31, wherein said first component comprises an organic compound.

39. The process of claim 31, wherein said first component comprises water.

40. The process of claim 31, wherein there are six feed-side baffles.

* * * * *